United States Patent [19]

Sakakibara et al.

[11] Patent Number: 4,561,509
[45] Date of Patent: Dec. 31, 1985

[54] COMBINATION WEIGHING MACHINE

[75] Inventors: Sakuichi Sakakibara, Kobe; Yoshiaki Tokuda, Kyoto; Tamio Nagai, Suita; Yoshitaka Mikata, Himeji; Kazuhiro Nishide, Kobe, all of Japan

[73] Assignees: House Food Industrial Company, Limited; Yamato Scale Company, Limited, both of Japan

[21] Appl. No.: 563,629

[22] Filed: Dec. 20, 1983

[51] Int. Cl.[4] .................... G01G 19/22; G01G 19/00
[52] U.S. Cl. ........................................ 177/25; 177/145
[58] Field of Search ................... 177/25, 58, 145, 50

[56] References Cited

U.S. PATENT DOCUMENTS

| | | | |
|---|---|---|---|
| 3,620,316 | 11/1971 | Henry et al. | 177/50 |
| 4,206,822 | 6/1980 | Mazzucchelli | 177/25 |
| 4,344,492 | 8/1982 | Hirano | 177/25 |
| 4,385,671 | 5/1983 | Hirano | 177/25 |
| 4,467,882 | 8/1984 | Mikami | 177/58 |

OTHER PUBLICATIONS

"Undated 6-page publication entitled Selectacom 21 by Triangle Package Machinery Company".

*Primary Examiner*—George H. Miller, Jr.
*Attorney, Agent, or Firm*—Senniger, Powers, Leavitt and Roedel

[57] ABSTRACT

An automatic combination weighing machine, having a plurality of weighing units, weighing batches of product or articles by the respective units at the same time and selecting some of the batches exhibiting the total weight meeting a predetermined condition, is provided, wherein each weighing unit is provided with automatic loading and unloading devices and the weighing units are arranged side by side in a line so that the respective loading and unloading paths are parallel to each other, in contrast to the prior machine wherein the weighing units are arranged circularly. This linear type of machine occupies less area than the circular type and can be cleaned easily, and it is more convenient for use in conjunction with soft small product for food, such as meat cutlets and vegetables.

3 Claims, 3 Drawing Figures

COMBINATION WEIGHING MACHINE

This invention relates to a combination weighing machine and, especially to an improved mechanical arrangement thereof.

The weighing device, which is generally referred to as "combination balance" or "combination weighing machine" is used for extracting a plurality of articles from a group of articles, such as candies, fruits or vegetables, having relatively large variances in their unit weights, to form a subgroup having a weight which is substantially equal to a predetermined target weight or, in general, which satisfies a predetermined condition. A typical example of such a device is disclosed in U.S. Pat. No. 4,344,492 granted to T. Hirano on Aug. 17, 1982. As described in this patent, the prior art combination weighing machine has a plurality of weighing units arranged circularly around a central vibration feeder, and a hopper or chute for collecting the articles discharged from the selected weighing units, which is located just under the feeder. Although this type of machines is suitable for dry and hard articles, some problems have arisen in case of wet and soft articles such as meat cutlets and cooked foods, especially, in respect to the smooth flow of articles and cleaning and maintenance of machines.

Therefore, an object of this invention is to provide a combination weighing machine having an improved mechanical structure which can remove the above problems.

Another object of this invention is to provide a combination weighing machine having a mechanical arrangement which occupies less floor area than the prior art machines.

According to this invention, provided is a combination weighing machine comprising a plurality of weighing units arranged side by side in a line. The weighing units are provided upstream thereof with respective vibration article feeders which are independently actuated by loading signals to feed a predetermined amount of articles to selected ones of the weighing units from a common source. The weighing units are also provided with respective unloading devices which are selectively actuated by unloading signals to forcibly discharge or remove the articles from the corresponding weighing units to collect them in a common spot. As a feature of this invention, the loading and unloading paths of the articles of the respective weighing units are arranged in compact fashion and substantially in parallel side by side relation.

These and other objects and features of this invention will be described in more detail hereinafter with reference to the accompanying drawings.

In the drawings.

Throughout the drawings, the same reference numerals are given to like structural components.

Figure 1:
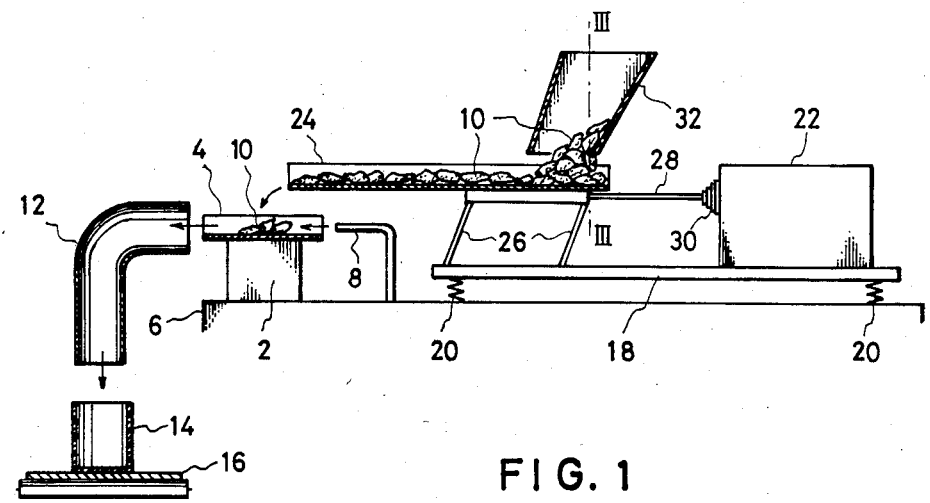
FIG. 1 is a partly sectional side view representing an embodiment of a combination weighing machine according to this invention.

Referring to FIG. 1, this embodiment of the combination weighing machine comprises eight weighing units 2 provided with elongate relatively narrow trough-type weighing scales or cradles 4, arranged side by side in a line on a stationary base or table 6. Each weighing cradle 4 has a bottom, opposite sides and open opposite ends. Upstream of the weighing cradles 4 at one end thereof, air jetting nozzles 8 are arranged, respectively, such that they are selectively actuated by respective unloading signals supplied from a control unit (not shown) to provide air jets to articles 10 on the weighing cradles 4 to blow them off the cradles in downstream direction.

Downstream of the weighing cradles 4, a common collecting chute 12 (chute means) is fixed to the table 6 through a suitable support member (not shown). The collecting chute has a mouth or inlet opening which is relatively large in relation to the width of a weighing cradle 4. While the relatively large inlet opening of the chute 12 faces to receive the articles 10 blown off from the weighing cradles 4, its outlet opens downwards to collect the articles in predetermined containers 14 transported successively by a belt conveyer 16 in synchronism with actuation of the air nozzles 8. The filled containers 14 are conveyed to a packing station (not shown).

Figure 2:
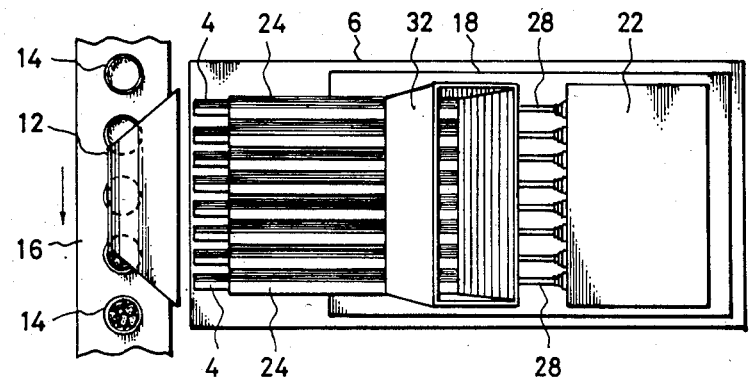
FIG. 2 is a plan view representing a part of the embodiment shown in FIG. 1.

Upstream of the weighing units 2, a platform 18 is supported on the table 6 through suitable vibration absorbers, such as springs 20, and a vibration generator 22 is mounted on the platform 18. On the platform 18, also, eight transporting troughs 24 are supported by respective parallelogrammatic support structures each including a pair of slanting support strips 26. The troughs 24 are arranged in generally horizontal parallel side by side, relation as shown in FIG. 2, so that their front (outlet) ends are located just above the corresponding weighing cradles 4. The troughs 14 are coupled through respective connecting rods 28 to the vibration generator 22. The connecting rods 28 and the casing of the vibration generator 22 are air-tightly sealed by bellows 30 for preventing invasion of dust and other contaminants. The vibration generator 22 may be of conventional type, such as an electromagnetic type, arranged to provide horizontal or axial vibration to the connecting rods 28 individually and selectively in response to respective loading signals supplied from the control unit (not shown). Such a control unit is disclosed, for example, in the aforementioned U.S. patent.

Figure 3:
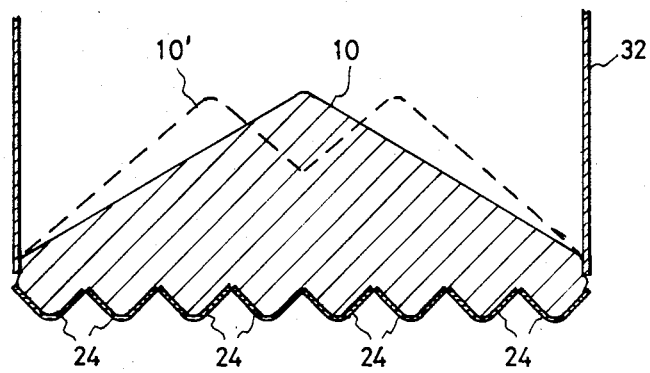
FIG. 3 is a sectional front view representing a part or arrangement of FIG. 1 along line III—III.

Above the rear (inlet) ends of the troughs 24, a common feeding hopper 32 is fixed to the table 6 through a suitable support member (not shown) so that the articles 10 supplied manually or automatically therein spread over all the troughs 24, as shown in FIG. 3. The articles 10 may be supplied into the hopper 32 so as to make a single heap as shown by solid lines, or plural heaps as shown by dashed lines 10', in accordance with the demand of article features, such as rest angle.

After the loose unpackaged articles 10 on the selected weighing units 2 are blown off, specific loading signals are supplied to the vibration generator 22 and the corresponding connecting rods 28 are vibrated horizontally or axially. Due to the inclination of the support strips 26, this vibration causes vibration of the corresponding transporting troughs 24 in the direction substantially perpendicular to the slanting strips 26. As well known in the art, this vibration results in forward (leftward, in FIG. 1) movement of the articles 10 on the troughs 24 and resultant re-loading of the vacant weighing units 2.

The combination selection and the loading and unloading control of this combination weighing machine will not be described further since they have no direct connection to the subject matter of this invention. However, reference can be made therefor to U.S. Pat. No. 4,385,671 granted to T. Hirano on May 31, 1983, as well as the aforementioned U.S. patent.

As easily understandable from the above description, the machine of this invention is very compact in structure and occupies little area. Moreover, its components contacting the articles being processed are easily accessible for cleaning and other services. Accordingly, the machine is especially suitable for use with soft and wet food product which needs frequent cleaning of such components.

We claim:

1. A combination weighing machine adapted for delivery of quantities of articles measured by weight, with each quantity being of an acceptable weight relative to a reference weight, comprising:

a set of weighing scales arranged side-by-side, each adapted to weigh a plurality of loose unpackaged articles constituting a fraction of said quantity and each adapted for unloading of said articles therefrom to contribute to a delivery;

a set of article conveyors, one for each weighing scale, arranged in side-by-side generally parallel relation for conveying said loose unpackaged articles along generally parallel paths to said weighing scales, each article conveyor having inlet and outlet ends, the outlet end of each article conveyor being disposed above a respective weighing scale for discharge of loose unpackaged articles from the conveyor into said scale;

a set of air jets, one for each scale, for blowing loose unpackaged articles off said scales in a generally horizontal direction generally parallel to said paths; and chute means adjacent said weighing scales having a relatively large inlet for receiving loose unpackaged articles blown off said scales and an outlet through which said articles are adapted to be discharged.

2. A combination weighing machine as set forth in claim 1 wherein each weighing scale is generally trough-shaped with a bottom, opposite sides and open ends, said air jets being located at one end of said scales and said chute means being located at the other end of the scales, the inlet of said chute means being large in relation to the width of each scale for receiving said loose unpackaged articles blown off the scale.

3. A combination weighing machine as set forth in claim 1 adapted for delivery of quantities of said articles to containers on a conveyor, said air jets being operable in synchronization with said conveyor carrying said containers to blow loose unpackaged articles off selected scales into said chute means to effect delivery of said articles to a container on said conveyor.

* * * * *